United States Patent [19]

Furukawa et al.

[11] Patent Number: 4,870,339
[45] Date of Patent: Sep. 26, 1989

[54] VARIABLE-SPEED POWER GENERATING SYSTEM

[75] Inventors: Yosio Furukawa; Yasuhiro Yasaka, both of Hitachi; Osamu Nagura, Katsuta; Eiji Haraguchi, Ibaraki; Hiroto Nakagawa, Osaka; Yasuteru Oono, Kobe, all of Japan

[73] Assignees: Hitachi Ltd., Tokyo; The Kansai Electric Power Co., Inc., Osaka, both of Japan

[21] Appl. No.: 144,108

[22] Filed: Jan. 15, 1988

[30] Foreign Application Priority Data

Jan. 19, 1987 [JP] Japan ................................ 62-8061

[51] Int. Cl.$^4$ .............................................. H02H 7/06
[52] U.S. Cl. .................................... 322/29; 307/87; 322/32
[58] Field of Search ...................... 322/29, 32; 307/87

[56] References Cited

U.S. PATENT DOCUMENTS 3,887,820 6/1975 Glennon ................................ 307/87
4,308,465 12/1981 Lafuze ................................... 307/87

FOREIGN PATENT DOCUMENTS

1256771 12/1967 Fed. Rep. of Germany .
2845930 4/1980 Fed. Rep. of Germany .
55-56499 4/1980 Japan .
2095487 9/1982 United Kingdom .

Primary Examiner—R. J. Hickey
Attorney, Agent, or Firm—Fay, Sharpe, Beall, Fagan, Minnich & McKee

[57] ABSTRACT

A variable-speed power generating system comprises a variable-speed generator electrically connected at its primary winding to an electric power system and its secondary winding to the electric power system through a frequency converter and mechanically coupled to a driver driving the secondary side thereof, a phase detector generating an output signal representing a slip frequency in response to the application of a first input having a frequency component of an output generated from the primary winding of the variable-speed generator and a second input having a frequency component corresponding to the rotation speed of the driver, a controller controlling the frequency converter on the basis of a reference phase provided by the output signal of the phase detector, and regulating means for controlling the frequency converter so that, when the variable-speed generator is disconnected from the electric power system, the frequency applied to the secondary winding of the variable-speed generator may not deviate from a predetermined allowable range of variable frequency operation of the frequency converter.

9 Claims, 5 Drawing Sheets

VARIABLE-SPEED POWER GENERATING SYSTEM

BACKGROUND OF THE INVENTION

This invention relates to a variable-speed power generating system including a variable-speed generator whose secondary winding is excited by an AC signal having a variable frequency, so that an electrical power output having a constant frequency can be always generated regardless of the rotation speed of the generator. More particularly, this invention relates to a variable-speed power generating system in which its variable-speed generator can stably operate even when the generator is disconnected from an associated electric power system due to occurrence of a trouble in the electric power system.

A conventional synchronous machine is commonly widely used as a generator for supplying electric power to an electric power system, and, in this case, the frequency of the AC voltage of the electric power system is always proportional to the rotation speed of the generator. On the other hand, when a variable or adjustable-speed generator which is basically similar to an induction machine is used to supply electric power to an electric power system, the rotation speed of the variable-speed generator can be freely selected independently of the output frequency while maintaining the output frequency to be equal to the system frequency. Thus, when such a variable-speed generator is combined with a driver which is, for example, a water turbine, the water turbine can be operated at a rotation speed at which the water turbine exhibits its highest turbine efficiency. Therefore, various researches and studies have been made hitherto on such a variable-speed power generating system. A variable-speed power generating system comprising the combination of a water turbine and a variable-speed generator is disclosed in, for example, Japanese patent application unexamined publication JP-A-55-56499. In the disclosed power generating system, the rotor side (the secondary side) of the variable-speed generator is excited by an alternating current of a variable frequency relating with the rotation speed of the rotor, so that an electric power output having a constant frequency can be always generated from the stator side of the generator without regard to the rotation speed of the rotor.

The structure of the disclosed variable-speed power generating system will be briefly described together with a main control system belonging thereto. The variable-speed generator is connected at its primary winding to an electric power system through a high-voltage side breaker, a main transformer and a low-voltage side breaker. This variable-speed generator has its primary and secondary windings disposed on the stator side and rotor side respectively and is coupled at its rotor shaft to the water turbine which drives the variable-speed generator. Further, the secondary winding of the variable-speed generator is connected through a frequency converter to the primary side of the variable-speed generator. Further, a permanent-magnet generator for detecting the rotation speed of the rotor and a phase detector for detecting the rotation phase of the rotor are coupled to the rotor shaft of the variable-speed generator.

In the variable-speed power generating system having a structure as described above, its output frequency $f_O$ is the sum of a frequency $f_N$ determined according to the rotation speed of the water turbine and a so-called slip frequency $f_S$. One of principal or fundamental control units incorporated in the variable-speed power generating system is the speed governor governing the rotation speed of the water turbine which drives the variable-speed generator, and the speed governor controls the opening of the guide vanes of the water turbine, so that the water turbine can operate at a rotation speed (hence, the frequency $f_N$) at which it exhibits its highest turbine efficiency. The aforementioned permanent-magnet generator is a rotation speed detector for controlling the rotation speed of the variable-speed generator by feedback control. Another fundamental control unit provided in the variable-speed power generating system is the aforementioned frequency converter generating an AC output for exciting the secondary winding of the variable-speed generator. The aforementioned phase detector detects the difference between the output frequency (=the system frequency) $f_O$ and the frequency $f_N$ determined according to the rotation speed of the water turbine, that is, the slip frequency $f_S$, and the firing angle of thyristors constituting the frequency converter is controlled so as to cause the frequency of the converter output exciting the secondary winding of the variable-speed generator to be equal to the detected slip frequency $f_S$.

According to the variable-speed power generating system having these two fundamental control units, the frequency converter applies its output having the slip frequency relating to the rotation speed of the rotor and the power system frequency to the secondary side of the variable-speed generator during trouble-free normal operation of the electric power system. (That is, the secondary winding of the variable-speed generator is excited by the converter output having a frequency equal to the slip frequency $f_S$ representing the difference between the frequencies at the primary side and the rotation speed respectively of the variable-speed generator during normal operation of the electric power system.) Therefore, the variable-speed power generating system can always generate electric power having the same frequency as the system frequency of the electric power system even when the rotation speed of the variable-speed generator deviates from the synchronous speed, that is, regardless of a slight change in the rotation speed.

Thus, the variable-speed power generating system can continue its power generating operation without any special problem. However, a problem which will be described below arises when a trouble, for example, grounding of the bus bar of the electric power system occurs accidentally. As soon as such a trouble has occurred, the high-voltage side breaker is released to disconnect the variable-speed generator from the electric power system. When the load is cut off, the frequency of the output voltage appearing at the primary side of the disconnected variable-speed generator is applied now as an input to the phase detector. Since such a frequency is not maintained constant any more, it is now impossible to apply the constant system frequency as the input to the phase detector. That is, before the load is cut off, the frequency of the output voltage generated from the primary winding of the variable-speed generator and applied as one of inputs to the phase detector is equal to the constant and unvariable frequency of the electric power system. Thus, even when the frequency $f_N$ determined according to the rotation speed of the variable-speed generator varies, the slip frequency $f_S$ only varies with the variation of the frequency $f_N$, and the value of the frequency $f_O$ is maintained constant, as will be apparent from the relation $f_O$(constant)=$f_N$+$f_S$. However, after the load is cut off, the value of $f_O$ is not maintained constant and unvariable any more in the electric power system, and $f_O$ does not mean the system frequency any more but merely means the frequency of the output generated from the primary winding of the variable-speed generator. Therefore, a variation of the frequency $f_N$ corresponding to the rotation speed of the variable-speed generator driven by the water turbine under such a condition results in corresponding variations of $f_S$ and $f_O$, and the output frequency of the variable-speed generator is not maintained constant.

As is well known, an input and an output energy of such a variable-speed generator are normally balanced, and the mechanical energy generated by the rotation of the water turbine is equal to the electrical energy generated from the variable-speed generator. However, immediately after the load is cut off, the electrical energy generated from the variable-speed generator is nearly null, and, since almost all the mechanical energy generated by the rotation of the water turbine is consumed to increase the rotation speed of the rotor, the rotor is accelerated. Although the rotation speed of the accelerated rotor is finally converged to a fixed value by the function of the water-turbine speed governor, a transient speed variation occurs inevitably until the rotation speed of the rotor is settled at the fixed value. Thus, when one of the input signals to the phase detector is derived from the output side of the variable-speed generator, the slip frequency $f_S$ and the output frequency $f_O$ of the variable-speed generator tend to become unstable under the influence of the speed variation of the rotor. Especially, the slip frequency $f_S$ may deviate from its allowable frequency range, thereby preventing continuous excitation of the secondary winding, that is, preventing driving of the variable-speed generator with its secondary winding excitation under no load. This means that the secondary winding of the disconnected variable-speed generator must be once deenergized under no load condition and when it is to be pulled in the electric power system again, the secondary winding of the variable-speed generator must be excited again before it is connected to the electric power system again. Thus, in such a case, the variable-speed generator cannot be quickly pulled in the electric power system again. Further, because the output frequency $f_O$ of the generator cannot be fixed, a large length of time is required for finding the synchronizing conditions to pull the generator in the electric power system again.

Therefore, there has been a strong demand for a variable-speed power generating system including a variable-speed generator which can be driven in a no-load secondary-excitation mode in which its secondary winding is continuously excited under no load even when its load is cut off.

SUMMARY OF THE INVENTION

With a view to meet the demand described above, it is an object of the present invention to provide a variable-speed power generating system of the type including a variable-speed generator which can operate in a no-load secondary-excitation mode even when a trouble occurs in an associated electric power system, and its rotation speed and output frequency are rendered unstable as a result of cut-off of its load, so that the generator can be quickly pulled in the electric power system again.

The variable-speed power generating system according to the present invention comprises a change-over switch circuit through which a first reference frequency signal corresponding to a system frequency and a second reference frequency signal produced by a reference frequency generator can be selectively applied to a frequency converter which is controlled by a control signal applied from a phase detector. The change-over switch circuit includes a first change-over switch which is closed to permit transmission of the first reference frequency signal during normal operation of the electric power system and a second change-over switch which is closed to permit transmission of the second reference frequency signal when the variable-speed generator is disconnected from the electric power system, that is, when the load of the generator is cut off. In the case where the load is cut off, the frequency converter is controlled on the basis of the second reference frequency signal.

In the case where the load is cut off, the rotation speed of the variable-speed generator in the variable-speed power generating system increases temporarily, and the output frequency of the generator also varies until the function of a water-turbine speed governor is fully exhibited. However, at this time, the second change-over switch is closed to apply the second reference frequency signal to the frequency converter, and the secondary winding of the generator is excited by an AC output of a predetermined frequency applied from the frequency converter controlled on the basis of the second reference frequency signal. Therefore, a frequency deviating from its allowable range is not applied to, especially, the frequency converter, so that the variable-speed generator can be placed in the no-load secondary-excitation mode and can be quickly pulled in again without the need for starting it from no-load no-secondary-excitation mode.

DESCRIPTION OF THE PREFERRED EMBODIMENTS

Preferred embodiments of the present invention will now be described in detail with reference to the accompanying drawings.

Figure 1:
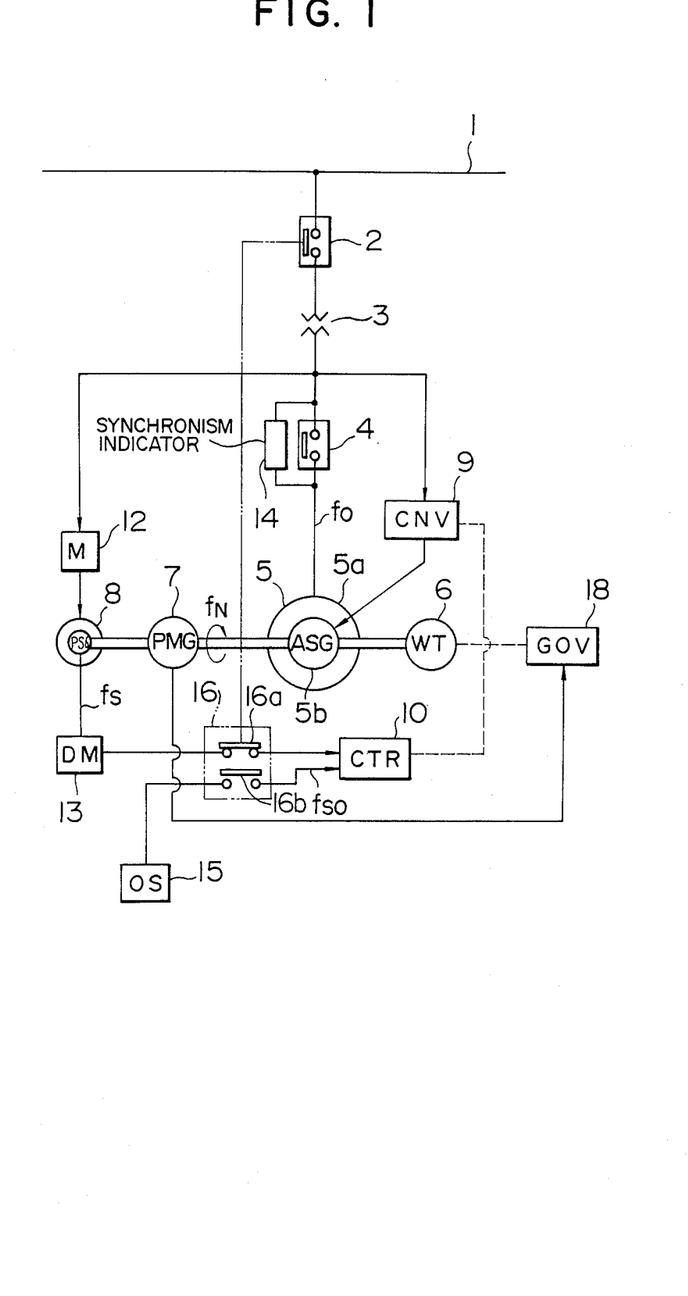
FIG. 1 is an electrical circuit diagram of an embodiment of the variable-speed power generating system of the present invention in which the slip frequency is controlled to be maintained at a constant value when its variable-speed generator is disconnected from an associated electric power system.

FIG. 1 is an electrical circuit diagram of an embodiment of the variable-speed power generating system according to the present invention. Referring to FIG. 1, a variable-speed generator or adjustable speed generator, for example, an induction generator 5 is directly coupled at its rotary shaft to that of a driver, for example, a water turbine 6. The induction generator 5 is connected at its stator-side primary winding 5a to an associated electric power system 1 through a low-voltage side breaker 4, a main transformer 3 and a high-voltage side breaker 2, and is connected at its rotor-side secondary winding 5b to an output terminal of a frequency converter 9 through collector rings (not shown) to be excited by an AC output of the frequency converter 9. The frequency converter 9 is connected at its input terminal to the output side, that is, the side of the primary winding 5a of the induction generator 5.

A permanent-magnet generator (a rotation speed detector) 7 and a phase detector 8 are mounted on the rotary shaft of the induction generator 5. The phase detector 8 has basically the same structure as that of the induction generator 5 and is connected at its stator-side primary winding to the primary winding 5a of the induction generator 5 through a modulator 12. Since the phase detector 8 is coaxial with the induction generator 5, a signal having a frequency equal to the slip frequency $f_S$ of the induction generator 5 appears from a demodulator 13 connected to the secondary winding of the phase detector 8.

The frequency converter 9 is one of the control units in such a variable-speed power generating system, and a controller 10 is provided to control the firing angle of thyristors constituting the frequency converter 9. The output signal of the phase detector 8 and the output signal of a low-frequency oscillator 15 are selectively applied to the controller 10. For this purpose, a change-over switch assembly 16 including a first change-over switch 16a and a second change-over switch 16b is provided to connect the controller 10 to both the phase detector 8 and the low-frequency oscillator 15, so that one of the output signal of the phase detector 8 and the output signal of the low-frequency oscillator 15 can be applied to the controller 10 depending on the operating condition of the induction generator 5. That is, when, for example, the high-voltage side breaker 2 operates to disconnect the induction generator 5 from the electric power system 1, the change-over switch 16b in the change-over switch assembly 16 is closed in interlocking relation with the breaking operation of the high-voltage side breaker 2 to apply the output signal of the low-frequency oscillator 15 to the controller 10. On the other hand, during normal operation, the change-over switch 16a in the change-over switch assembly 16 is closed to apply the output signal of the phase detector 8 to the controller 10. The frequency converter 9 may have any suitable structure provided that it can apply an output having the slip frequency $f_S$ to the secondary winding 5b of the induction generator 5, and a type commonly called a cycloconverter is used as this frequency converter 9. The allowable frequency range of the output of the cycloconverter is limited by the capacity of the cycloconverter or by the allowable amount of higher harmonics generated from the cycloconverter. Generally, this allowable frequency range is selected to be within 10% of the rated frequency. This means that, when the power system frequency $f_O$ is, for example, 50 Hz, the cycloconverter is designed so as to be capable of supplying an output having a slip frequency $f_S$ falling within a range of +5 Hz to −5 Hz. This means also that the induction generator 5 is designed so that it can operate at a rotation speed corresponding to a frequency range of 45 Hz to 55 Hz. When the slip frequency $f_S$ is outside of the allowable frequency range specified above, the cycloconverter will operate under an overloaded condition or a very large amount of higher harmonics will be supplied to the electric power system 1. Therefore, the cycloconverter is required to generate its output falling within the allowable range of the slip frequency $f_S$ described above. Another control unit provided in the variable-speed power generating system is guide vanes of the water turbine 6, and the rotation speed of the water turbine 6 is controlled to be maintained constant by a water-turbine speed governor 18 to which the output signal of the permanent-magnet generator 7 is applied. The frequency of the output signal of the permanent-magnet generator 7 corresponds to that falling within the range of 45 Hz to 55 Hz, and the frequency of the output signal of the phase detector 8 corresponds to that falling within the range of +5 Hz to −5 Hz. The frequency of the output signal of the low-frequency oscillator 15 is selected to be a suitable constant reference value $f_{SO}$ falling within the range of +5 Hz to −5 Hz.

During normal operation of the electric power system 1, the variable-speed generator 5 is driven by the water turbine 6, and the voltage generated from the variable-speed generator 5 is supplied to the electric power system 1 through the low-voltage side breaker 4, the main transformer 3 and the high-voltage side breaker 2. In the normal operation, the frequency converter 9 controlled by the controller 10 controls the frequency exciting the rotor-side secondary winding 5b of the variable-speed generator 5. The controller 10 receives its input signal through the modulator 12, the phase detector 8 and the demodulator 13. Suppose now that, during this normal operation, a trouble occurs in the electric power system 1, and the high-voltage side breaker 2 operates in response to, for example, the trouble, thereby cutting off the load from the variable-speed generator 5. As soon as the load is cut off, the change-over switch 16a connecting the phase detector 8 to the controller 10 is opened, and the change-over switch 16b is now closed to connect the low-frequency oscillator 15 to the controller 10. Therefore, the low-frequency oscillator 15 applies its output signal of a predetermined low frequency to the controller 10.

Figure 2:
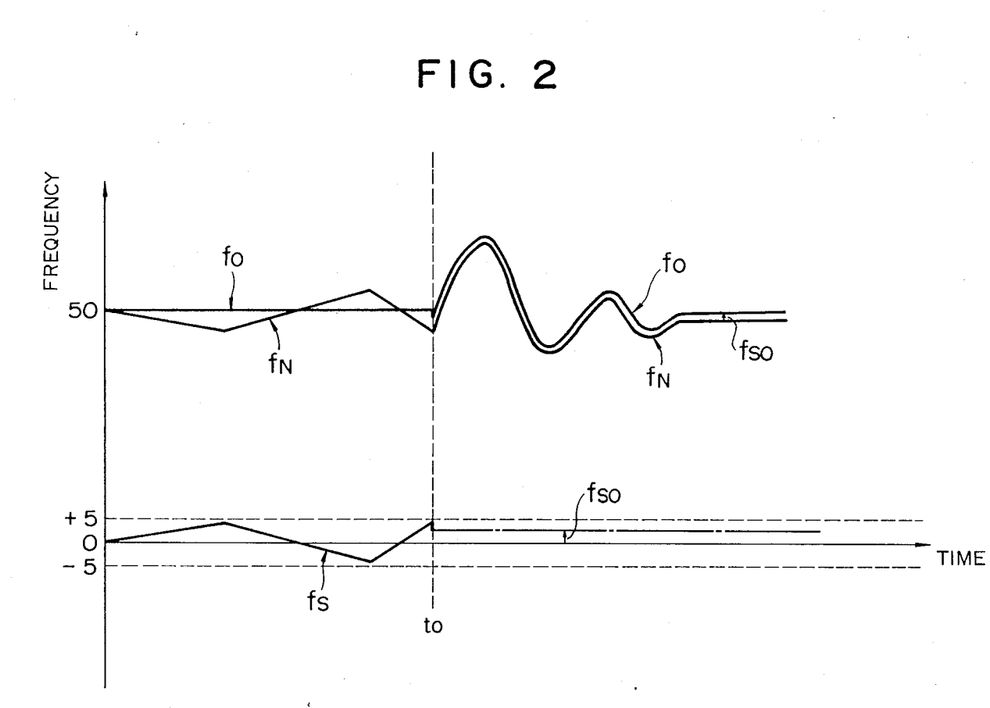
FIG. 2 illustrates the operation of the variable-speed system shown in FIG. 1.

The result of the above manner of control is shown in FIG. 2. Referring to FIG. 2, in a period before time $t_0$ where the electric power system 1 is under normal operation, the constant and unvariable system frequency $f_O$ is applied to the phase detector 8. The rotation speed of the variable-speed generator 5 driven by the water turbine 6 whose rotation speed is controlled by the speed governor 18 is variably controlled. Therefore, when the frequency $f_N$ determined according to the rotation speed of the water turbine 6 increases or decreases, the slip frequency $f_S$ also decreases or increases by an amount corresponding to the increment or decrement of the frequency $f_N$, thereby maintaining constant the system frequency $f_O$. As described already, the frequency $f_N$ is controlled so as to be variable within the range of 45 Hz to 55 Hz, and the frequency $f_S$ is controlled so as to be variable within the range of +5 Hz to −5 Hz. On the other hand, when the high-voltage side breaker 2 is released in response to the occurrence of a trouble in the electric power system 1, the frequency $f_O$ does not represent the system frequency any more but merely represents the output frequency of the variable-speed generator 5 and is not constant and unvariable any more. In such a case, due to the loss of the balance between the input energy supplied from the water turbine 6 and the output energy produced from the generator 5, the rotation speed of the generator 5 tends to sharply increase, and the frequency $f_N$ also tends to show a sharp increase. However, according to the present invention, the slip frequency $f_S$ is restricted by the reference frequency $f_{SO}$ of the output signal of the low-frequency oscillator 15. Therefore, the output frequency $f_O$ of the generator 5 is given by the sum ($F_{SO}+f_N$). That is, the frequency $f_{SO}$ having the fixed width is added to the frequency $f_N$, and the sum ($f_{SO}+f_N$) repeatedly increases and decreases with time. After a short period of time, the frequency $f_N$ is converged to a suitable level by the function of the water-turbine speed governor 18, and the frequency $f_O$ is also stabilized.

There is no guarantee that the stabilized value of $f_O$ becomes equal to the system frequency. However, under such a condition, the slip frequency $f_S$ provided by the output of the frequency converter 9 is maintained at the value of $f_{SO}$ without deviating from its allowable range of +5 Hz to −5 Hz. After the occurrence of the trouble, the variable-speed generator 5 is placed in the no-load secondary-excitation mode. However, there is a great possibility that the output frequency of the variable-speed generator 5 is not still equal to the system frequency of the electric power system 1. Therefore, the variable-speed generator 5 should be re-connected to the electric power system 1 after confirming that the voltage value, frequency and phase of the generator output satisfy the so-called pull-in permitting conditions.

The embodiment shown in FIG. 1 has been described with reference to the case where the change-over switch assembly 16 is changed over in response to the breaking operation of the high-voltage side breaker 2. However, it is apparent that the change-over switch assembly 16 may be changed over in response to the breaking operation of the low-voltage side breaker 4 or in response to a change signal representing a change in the current, voltage or frequency of the output of the variable-speed generator 5. Further, although the change-over switch assembly 16 is preferably disposed in the stage preceding the controller 10 from the viewpoint of simplification of the structure and function of the controller 10, this is not an essential requirement. In a modification, another controller may be incorporated in, for example, the low-frequency oscillator 15, and the change-over switch assembly 16 may be disposed between the frequency converter 9 and these controllers.

The embodiment shown in FIG. 1 employs the low-frequency oscillator 15 as the source of the reference signal having the frequency $f_{SO}$. However, there are various modifications which include another unit which replaces the low-voltage oscillator 15.

Figure 3:
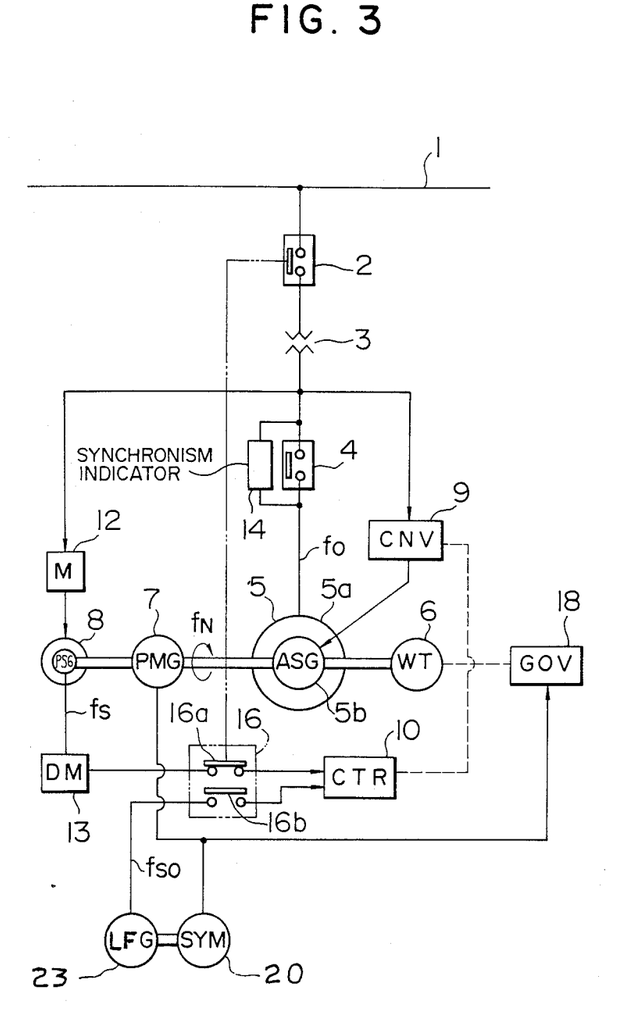
FIG. 3 is an electrical circuit diagram of a modification of the embodiment shown in FIG. 1, in which the slip frequency is controlled to be maintained at zero when the variable-speed generator is disconnected from the associated electric power system.

FIG. 3 shows one of such modifications of the embodiment shown in FIG. 1. The modification shown in FIG. 3 differs from the embodiment shown in FIG. 1 in the structure of the part functioning to generate the low-frequency signal after the load is cut off. More precisely, the modification shown in FIG. 3 includes a low-frequency generator 23 and a synchronous motor 20 driving this low-frequency generator 23. After the variable-speed generator 5 is disconnected from the electric power system 1, the low-frequency generator 23 applies its output signal to the controller 10 through the change-over switch 16b. The synchronous motor 20 may be driven by a required power source. However, from the viewpoint of simplifying the structure of the power generating system, the power source driving the water-turbine speed governor 18, that is, the electric power of the permanent-magnet generator 7 may be utilized to drive the synchronous motor 20 in the modification shown in FIG. 3. In a simplest form, the output of the permanent-magnet generator 7 may be utilized to provide the low-frequency reference signal in this modification. In such a case, it is necessary to additionally provide a unit for decreasing the frequency of the output of the permanent-magnet generator 7 because the output frequency of this generator 7 is considerably high.

In the case of the embodiment shown in FIG. 1, the slip frequency $f_S$ is maintained at the constant value $f_{SO}$ after the load is cut off. On the other hand, in the case of the embodiment shown in FIG. 3, the slip frequency $f_S$ is given by $k \cdot f_N$ obtained by multiplying the frequency $f_N$ corresponding to the rotation speed by a frequency reduction factor k determined depending on the output frequency of the low-frequency generator 23. This frequency reduction factor k is selected to be a sufficiently small value of, for example, about 1/20 so that the value of $k \cdot f_N$ may not deviate from the aforementioned allowable frequency range of +5 Hz to −5 Hz even when the value of $f_N$ is a maximum that can be assumed. Thus, it will be apparent that the slip frequency $f_S$ is proportional to the frequency $f_N$ determined by the rotation speed of the variable-speed generator 5 and does not deviate from its allowable range.

Figure 4:
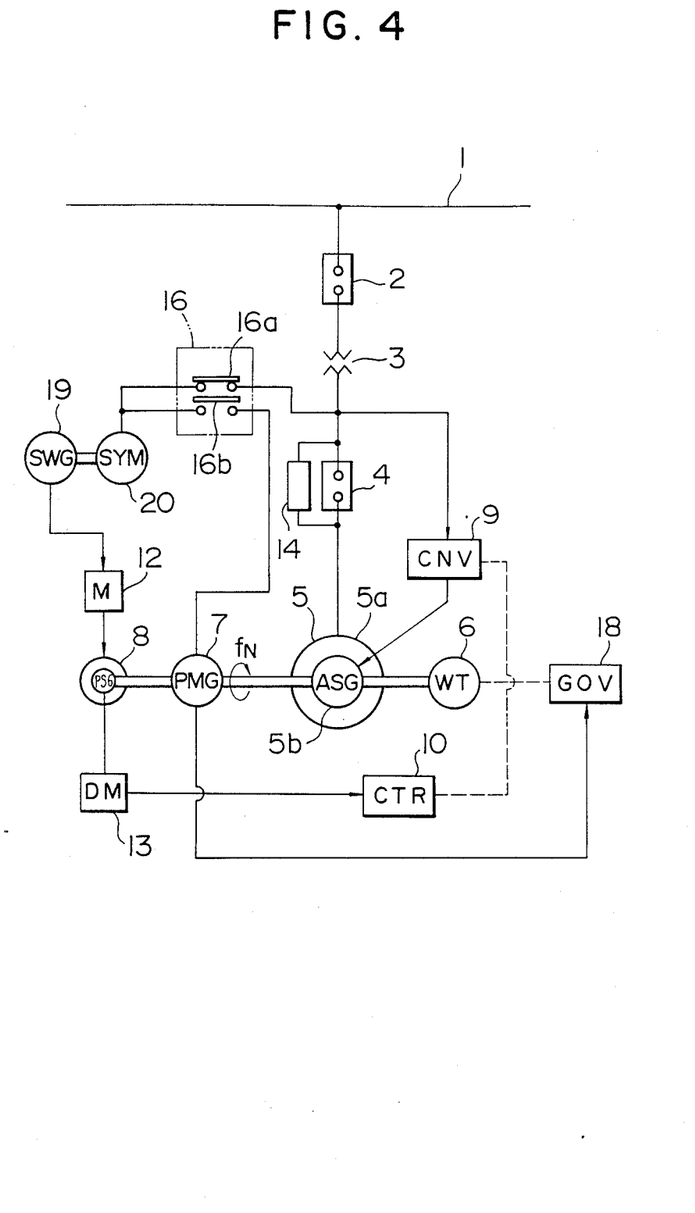
FIG. 4 is an electrical circuit diagram of a modification of the embodiment shown in FIG. 3, in which the slip frequency is controlled to be maintained at a value determined by an output of a permanent magnet generator coupled to the variable-speed generator when the variable-speed generator is disconnected from the associated electric power system.

FIG. 4 shows a modification of the embodiment shown in FIG. 3. In this modification, the output of the phase detector 8 is not applied to the change-over switch assembly 16, but the input to the phase detector 8 itself is changed over by the change-over switch assembly 16.

Referring to FIG. 4, a synchronous generator 19 and a synchronous motor 20 for driving the synchronous generator 19 are connected to the primary side of the variable-speed generator 5 through the change-over switch assembly 16. The synchronous generator 19 is connected at its output to the modulator 12 disposed in the stage preceding the phase detector 8. The permanent-magnet generator 7 is directly coupled to the rotor of the variable-speed generator 5. This permanent-magnet generator 7 is one form of a synchronous generator in which the number of poles is equal to that of the variable-speed generator 5 and the rotor is made of a permanent magnet material. The electric power output of the permanent-magnet generator 7 is used to drive the water-turbine speed governor 18 controlling the rotation speed of the water turbine 6. The electric power output of the permanent-magnet generator 7 is also connected to the change-over switch 16b of the change-over switch assembly 16 to be also used as a power supply for driving the synchronous motor 20. The other change-over switch 16a is connected to the electric power system 1.

The operation of the embodiment having the structure shown in FIG. 4 will now be described. In view of the complexity of the change-over operation by the change-over switch assembly 16, the operation of the variable-speed power generating system will be described by dividing it into a starting stage of the variable-speed generator 5, an on-load operation stage, a load cut-off stage and a re-connection stage after the load cut-off stage.

(1) Starting Stage

Before starting the variable-speed generator 5, the high-voltage side breaker 2 is closed, the low-voltage side breaker 4 for pull-in purpose is opened, and both the change-over switches 16a and 16b are opened.

In response to a preliminary instruction for starting the variable-speed generator 5, the change-over switch 16a is closed to start the synchronous motor 20 by means of dumper starting. The synchronous generator 19 is synchronized, and its stable output frequency is maintained. After the rotation speed of the water turbine 6 increases and attains a level falling within a predetermined variable speed range, the secondary winding 5b of the variable-speed generator 5 is excited by the output of the frequency converter 9. When a synchronism indicator 14 indicates that the voltage, frequency and phase of the output appearing at the primary side of the variable-speed generator 5 match those of the electric power in the electric power system 1, the low-voltage side breaker 4 for pull-in purpose is closed to pull the variable-speed generator 5 in the electric power system 1.

In the combination of the synchronous motor 20 and the synchronous generator 19, its input frequency appears intact as its output frequency. Therefore, after the synchronous generator 19 is synchronized, the output frequency of the synchronous generator 19 is equal to the system frequency $f_O$. Thus, the phase detector 8 generates an output signal representing the slip frequency $f_S$ of the variable-speed generator 5.

(2) On-Load Operation Stage

In the state of the power generating system described above, the guide vanes of the water turbine 6 are opened under control of the water-turbine speed governor 18 to increase the output of the water turbine 6 so that the variable-speed generator 5 can bear the required load.

In this stage, the change-over switches 16a and 16b remain in their closed and open positions respectively without being actuated.

(3) Load Cut-Off Stage

When a trouble occurs in the electric power system 1, and the load is to be immediately cut off, the water-turbine speed governor 18 acts to close the guide vanes of the water turbine 6 in response to an instruction signal from the controller 10 so as to prevent an undesirable sharp increase in the rotation speed. The instruction signal from the controller 10 or a load cut-off instruction signal is used to open the change-over switch 16a. Then, he change-over switch 16b is closed to connect the permanent-magnet generator 7 to the synchronous motor 20 so that the power supply for driving the synchronous motor 20 is now changed over to the permanent-magnet generator 7 from the electric power system 1.

As a result, the frequency $f_N$ corresponding to the rotation speed of the variable-speed generator 5 is applied to the primary side of the phase detector 8 through the modulator 12. Since the frequency $f_N$ appears also at the secondary side of the phase detector 8, the output frequency of the phase detector 8 is zero. Therefore, after the load is cut off, the frequency $f_S$ exciting the secondary winding 5b of the variable-speed generator 5 is $f_S=0$, and the output frequency $f_O$ of the variable-speed generator 5 is controlled to be equal to the frequency $f_N$ corresponding to the rotation speed. The frequency $f_N$ itself is variable and controlled by the water-turbine speed governor 18.

(4) Re-Connection Stage After Load Cut-off Stage

The low-voltage side breaker 4 for pull-in purpose is opened, the high-voltage side breaker 2 is closed, and the change-over switch 16a is closed to drive the synchronous motor 20 by the power supplied from the electric power system 1. After the synchronism indicator 14 indicates that the voltage, frequency and phase of the output appearing at the primary side of the variable-speed generator 5 match those of the power of the electric power system 1, the low-voltage side breaker 4 for pull-in purpose is closed to pull the variable-speed generator 5 in the electric power system 1 again.

Thus, when the load is cut off, the synchronous generator 19 in the embodiment shown in FIG. 4 stably generates an output frequency equal to the reference frequency, and the effect exhibited by this embodiment is similar to that exhibited by the embodiment shown in FIG. 3.

The M-G set consisting of the synchronous motor 20 and the synchronous generator 19 is provided in the embodiment shown in FIG. 4 for the purpose of preventing undesirable fluctuation of the input applied to the primary side of the phase detector 8, due to occurrence of a trouble in the electric power system 1 or during the later change-over of the input by the change-over switch assembly 16. Therefore, the M-G set can be eliminated when such primary-side input fluctuation does not give rise to any especial problem in the power generating system.

Figure 5:
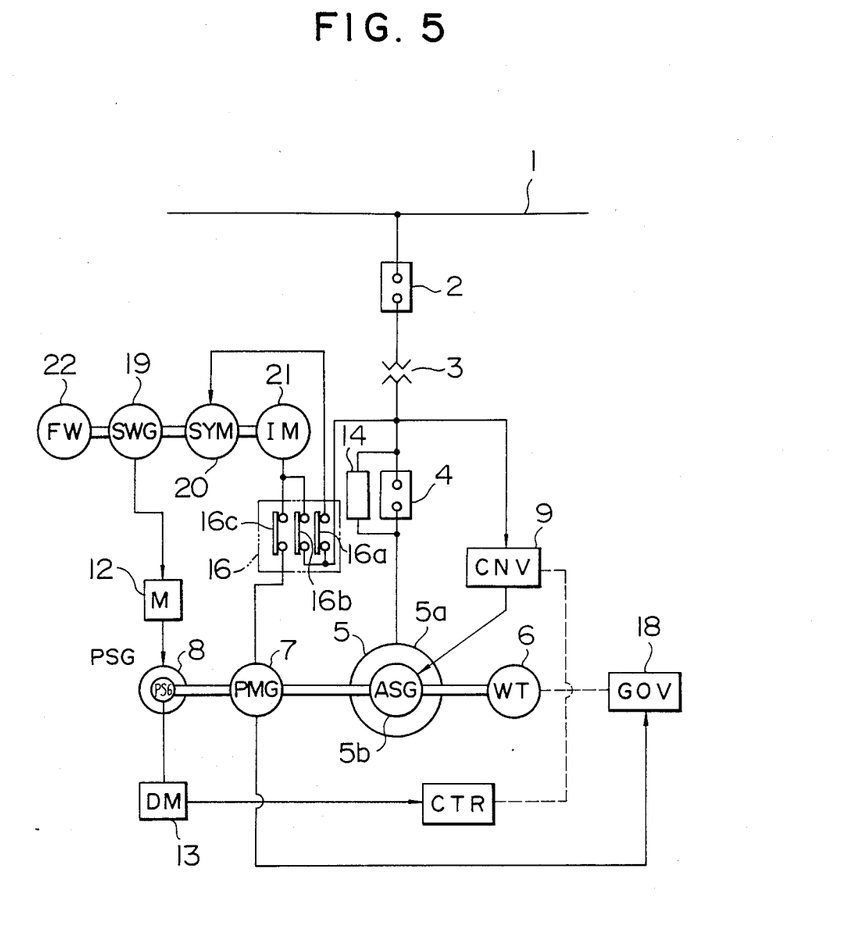
FIG. 5 is an electrical circuit diagram of a modification of the embodiment shown in FIG. 4, in which the slip frequency of the variable-speed generator is controlled according to a slip of the induction motor when the variable-speed generator is disconnected from the associated electric power system.

FIG. 5 shows a modification of the embodiment shown in FIG. 4. In the modification shown in FIG. 5, an induction motor 21 for starting the synchronous motor 20 is provided in coaxial relation with the synchronous motor 20, the synchronous generator 19 and a flywheel 22, and the change-over switch assembly 16 includes a third change-over switch 16c in addition to the change-over switches 16a and 16b. The change-over switches 16a, 16b and 16c in the change-over switch assembly 16 are selectively closed and opened, so that the synchronous generator 19 can be driven by the induction motor 21 in the load cut-off stage and also in the starting stage, while the synchronous generator 19 can be driven by the synchronous motor 20 during trouble-free normal operation of the electric power system 1.

Describing in more detail, the change-over switch 16b only is closed in the starting stage, and electric power supplied from the electric power system 1 is used to drive the induction motor 21 thereby rotating the synchronous motor 20 driving the synchronous generator 19. When the rotation speed of the synchronous motor 20 attains its rated value (the synchronous speed), the change-over switches 16b and 16a are opened and closed respectively to pull the synchronous motor 20 in the system. During the trouble-free normal operation of the electric power system 1, the synchronous generator 19 is driven by the synchronous motor 20. In this normal operation, the output frequency of the synchronous generator 19 is equal to the system frequency.

In the case where the load is cut off, the change-over switches 16a and 16b in the change-over switch assembly 16 are opened while closing the change-over switch 16c, so that the synchronous generator 19 is now driven by the induction motor 21 to which electric power is now supplied from the permanent-magnet generator 7. In this case, the output frequency of the synchronous generator 19 is not equal to the output frequency of the permanent-magnet generator 7, and there occurs a frequency difference attributable to the slip between the induction motor 21 and the synchronous motor 20. This frequency difference appears as an output of the phase detector 8, and the frequency of the output of the frequency converter 9 exciting the secondary winding of the variable-speed generator 5 is controlled so as to reduce the frequency difference to null. Thus, the slip of the induction motor 21 is utilized in the modification shown in FIG. 5, and it is apparent that the individual units are suitably selected so that this slip frequency may not deviate from the allowable frequency range of the frequency converter 9 in a transient state.

The modification shown in FIG. 5, in which the flywheel 22 is additionally provided, is advantageous in that the unit coefficient of inertia of the synchronous generator 19 relative to that of the variable-speed generator 5 can be maintained within a predetermined range, and the transient response characteristics of the power generating system at the time of load cut-off can be improved.

Another advantage of the modification shown in FIG. 5 is the use of the induction motor 21 for starting the synchronous motor 20. This induction motor 21 drives the synchronous generator 19 in lieu of the synchronous motor 20 when, for example, the load is cut off due to a trouble occurred in the electric power system 1. The induction motor 21 is capable of asynchronous operation regardless of an abrupt change in the frequency of its drive power source due to the change-over of the drive power source or regardless of a variation of the rotation speed due to the cut-off of the load. Therefore, the voltage and frequency of the output of the induction motor 21 follow up those of the output of the permanent-magnet genertor 7 with time, so that the shock attributable to the change-over of the drive power source can be sufficiently alleviated.

Thus, because of the combination of the merit of utilization of the inertia effect of the rotary bodies and the merit of the asynchronous operation characteristic of the induction motor 21, the variable-speed generator 5 can make a smooth shift from its on-load operation mode to its no-load secondary-excitation mode through a load cut-off step.

It will be understood from the foregoing detailed description of the present invention that a frequency deviating from an allowable frequency range is not applied from the frequency converter even if the rotation speed of the variable-speed generator may vary when its load is cut off. Therefore, regardless of cut-off of the load, the variable-speed generator can be maintained in its no-load secondary-excitation mode, so that the generator can be quickly pulled in the electric power system again.

We claim:

1. A variable speed power generating system to be connected to an electric power system, including:
   a frequency converter;
   a variable-speed generator having a primary winding electrically connected to the electric power system and a secondary winding electrically connected to said electric power system through the frequency converter;
   means for mechanically driving the secondary winding;
   phase detector means for generating an output signal representing a slip frequency in response to the application of a first input having a frequency component of an output generated from the primary winding of said variable-speed generator and a second input having a frequency component corresponding to the rotation speed of said means for mechanically driving:
   controller means for controlling said frequency converter on the basis of a reference phase provided by the output signal of said phase detector means; said frequency having a predetermined allowable range of variable frequency operation; regulated means for controlling said frequency converter and being responsive to disconnection of said variable-speed generator from said electric power system to apply a regulated frequency within the predetermined allowable range of variable frequency operation of said frequency convertor to the secondary winding of said variable-speed generator; speed detector means to generate an output signal representing the rotation speed of said means for mechanically driving;
   said regulating means including a synchronous motor driven by the output signal of said speed detector means, a low-frequency generator means mechanically coupled to said synchronous motor to generate an output signal having low frequency, and change-over means for applying the output signal of said low-frequency generator means to said controller means in lieu of the output signal of said phase detector when said variable-speed generator is disconnected from said electric power system.

2. A variable-speed power generating system to be connected to an electric power system, including:
   a frequency converter;
   a variable-speed generator having a primary winding electrically connected to the electric power system and a secondary winding electrically connected to said electric power system through the frequency converter;
   means for mechanically driving the secondary winding:
   phase detector means for generating an output signal representing a slip frequency in response to the application of a first input having a frequency component of an output generated from the primary winding of said variable-speed generator and a second input having a frequency component corresponding to the rotation speed of said means for mechanically driving:
   controller means for controlling said frequency converter on the basis of a reference phase provided by the output signal of said phase detector means; said frequency having a predetermined allowable range of variable frequency operation; regulated means for controlling said frequency converter and being responsive to disconnection of said variable-speed generator from said electric power system to apply a regulated frequency within the predetermined allowable range of variable frequency operation of said frequency convertor to the secondary winding of said variable-speed generator; a synchronous motor electrically connected to the primary winding of said variable-speed generator;

a synchronous generator driven by said synchronous motor;

speed detector means to generate an output signal representing the rotation speed of said means for mechanically driving, said synchronous generator applying its output signal as the first input to said phase detector; and said regulating means including change-over means for applying the output signal of said speed detector means to said synchronous motor in lieu of the output generated from the primary winding of said variable-speed generator when said variable-speed generator is disconnected from said electric power system.

3. A variable-speed generating system to be connected to an electric power system including:

a frequency converter;

a variable-speed generator having a primary winding electrically connected to the electric power system and a secondary winding electrically connected to said electric power system through the frequency converter;

means for mechanically driving the secondary winding:

phase detector means for generating an output signal representing a slip frequency in response to the application of a first input having a frequency component of an output generated from the primary winding of said variable-speed generator and a second input having a frequency component corresponding to the rotation speed of said means for mechanically driving:

controller means for controlling said frequency converter on the basis of a reference phase provided by the output signal of said phase detector means; said frequency having a predetermined allowable range of variable frequency operation; regulated means for controlling said frequency converter and being responsive to disconnection of said variable-speed generator from said electric power system to apply a regulated frequency within the predetermined allowable range of variable frequency operation of said frequency converter to the secondary winding of said variable-speed generator; a synchronous motor electrically connected to the primary winding of said variable-speed generator, a synchronous generator driven by said synchronous motor, and a speed detector means to generate an output signal representing the rotation speed of said means for mechanically driving;

means applying, an output signal of said synchronous generator as the first input to said phase detector; and said regulating means including an induction motor disposed in coaxial relation with said synchronous motor and said synchronous generator, and change-over means for inhibiting application of the output of the primary winding of said variable-speed generator to said synchronous motor and applying the output signal of said speed detector means to said induction motor when said variable-speed generator is disconnected from said electric power system.

4. A variable-speed power generating system according to claim 3, wherein said change-over means is responsive to restarting said variable speed generator to apply the output signal of said speed detector means to said induction motor while inhibiting application of said output signal to said synchronous motor, and, in response to attainment of the synchronous speed, said change-over means applies the output signal of said speed detector means to said synchronous motor while inhibiting application of said output signal to said induction motor.

5. A variable-speed power generating system to be connected to an electric power system, including:

a frequency converter;

a variable-speed generator having a primary winding electrically connected to the electric power system through the frequency converter and a secondary winding;

means for mechanically driving the secondary winding;

a phase detector means for generating an output signal representing a slip frequency in response to the application of a first input having a frequency component of an output generated from the primary winding of said variable-speed generator and a second input having a frequency component corresponding to the rotation speed of said means for mechanically driving;

a controller means for controlling said frequency converter on the basis of a reference phase provided by the output signal of said phase detector means;

speed detector means for detecting the rotation speed of said variable-speed generator and generating an output signal representing the detected rotation speed;

said frequency converter having a predetermined allowable range of variable frequency operation, said regulating means comprising change-over means for applying the output signal of said speed detector means as the first input to the primary winding of said phase detector means in response to said variable-speed generator being disconnected from said electric power system.

6. A variable-speed power generating system for connection to an electric power system, comprising:

a variable-speed generator having a stator with a primary winding electrically connected to the electric power system, a rotor with means for rotatingly driving the rotor, and a secondary winding:

frequency converter means connected between said electric power system and said secondary winding for supplying to said secondary winding an exciting current of a controlled frequency:

synchronous motor means for being normally driven at a first speed in synchronism with an output frequency of said primary winding:

a synchronous generator mechanically coupled to said synchronous motor to generate an output having a frequency determined by the rotation speed of said synchronous motor means:

phase detector means for generating an output signal representing a slip frequency in response to a first input having a frequency component of the output of said synchronous generator and a second input having a frequency component corresponding to a rotational speed of said rotor: and controller means for controlling said frequency converter based on the output signal of said phase detector means and switching means operative, when said variable-speed generator is disconnected from said electric power system, to change the rotation speed of said synchronous motor from said first speed to a second speed in synchronism with the rotation speed of said rotor.

7. A variable-speed power generating system for connection to an electric power system comprising:

a variable-speed generator having a stator with a primary winding electrically connected to the electric power system, a rotor with means to mechanically drive the rotor for rotation, and a secondary winding:

frequency converter means connected between said electric power system and said secondary winding for supplying to said secondary winding an exciting current of a controlled frequency:

synchronous motor means selectively energized to be driven at a first speed in synchronism with an output frequency of said primary winding:

induction motor means selectively energized to be driven at a second less than rotation speed of said rotor;

synchronous generator means mechanically coupled to said synchronous motor and said induction motor means to be driven selectively by any one energized motor means of said synchronous motor means and said induction motor means to generate an output having a frequency determined by a rotation speed of said energized one motor means;

phase detector means for generating an output signal representing a slip frequency corresponding to a difference between a first input having a frequency component of the output of said synchronous generator means and a second input having a frequency component corresponding to the rotation speed of said rotor:

controller means for controlling said frequency converter based on the output signal of said phase detector means; and switching means operating to normally energize said synchronous means and deenergize said induction motor means, and when said variable-speed generator is disconnected from said electric power system, to energize said induction motor means and deenergize said synchronous motor means.

8. A variable-speed power generating system according to claim 7, including means selectively energizing said induction motor means by electric power of said power system, and said switching means further operates to energize said induction motor means by the electric power of said power system and deenergize the synchronous motor means when said power generating system is started and until its rotation speed reaches its synchronous speed.

9. A variable-speed power generating system for connection to an electric power system, comprising:

variable-speed generator having a stator with primary winding electrically connected to the electric power system, a rotor with means for electrically driving the rotor for rotation, and a secondary winding;

a frequency converter connected between said electric power system and said secondary winding for supplying to said secondary winding an exciting current of controlled frequency:

phase detector means normally receiving a first signal having a frequency component of an output of said primary winding and a second signal having a frequency component corresponding to the rotation speed of said rotor for generating and output signal representing a slip frequency corresponding to a difference between first and second signals;

controller means for controlling said frequency convertor based on the output signal of said phase detector means;

switching means operating, when said variable-speed generator is disconnected from said electric power system, to cause said phase detector means to receive a third signal having a frequency component relating to the rotation speed of said rotor in place of said first signal.

* * * * *